June 17, 1958  R. C. DEMLER  2,838,992
APPARATUS FOR APPLYING METAL BANDS
ABOUT AN ARTICLE OR ARTICLES
Filed Sept. 2, 1952  8 Sheets-Sheet 5
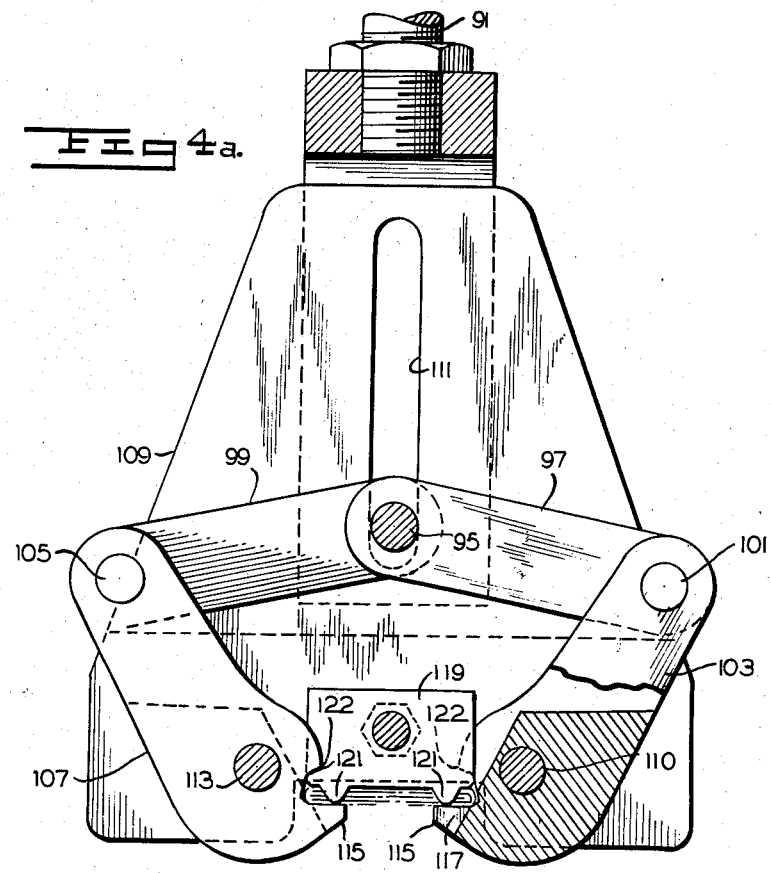
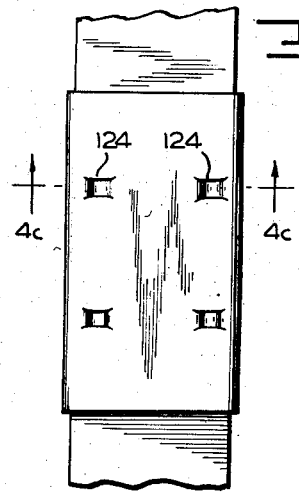
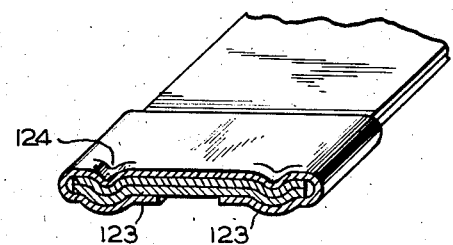
INVENTOR
RAY C. DEMLER
BY Cushman, Darby & Cushman
ATTORNEY

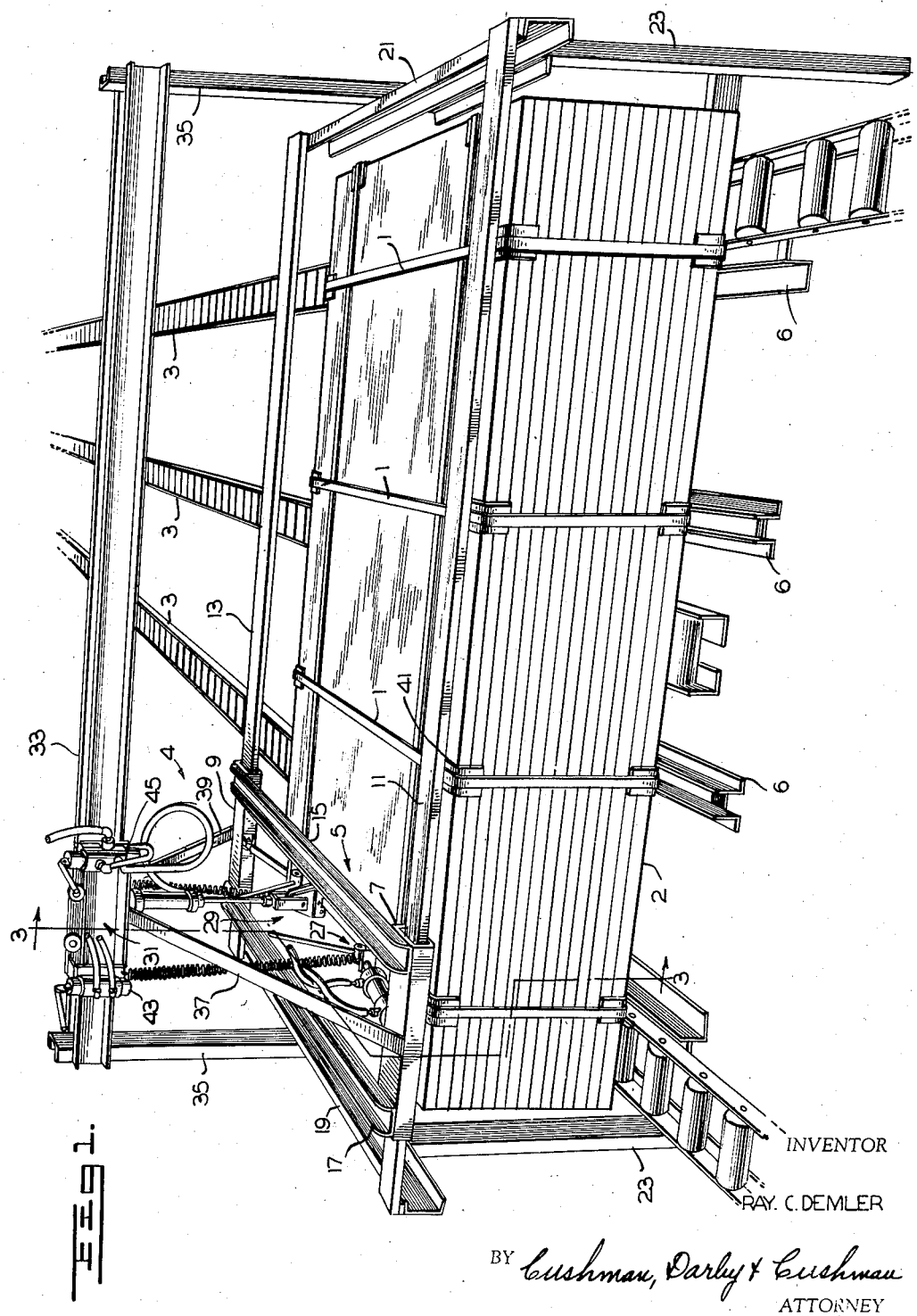

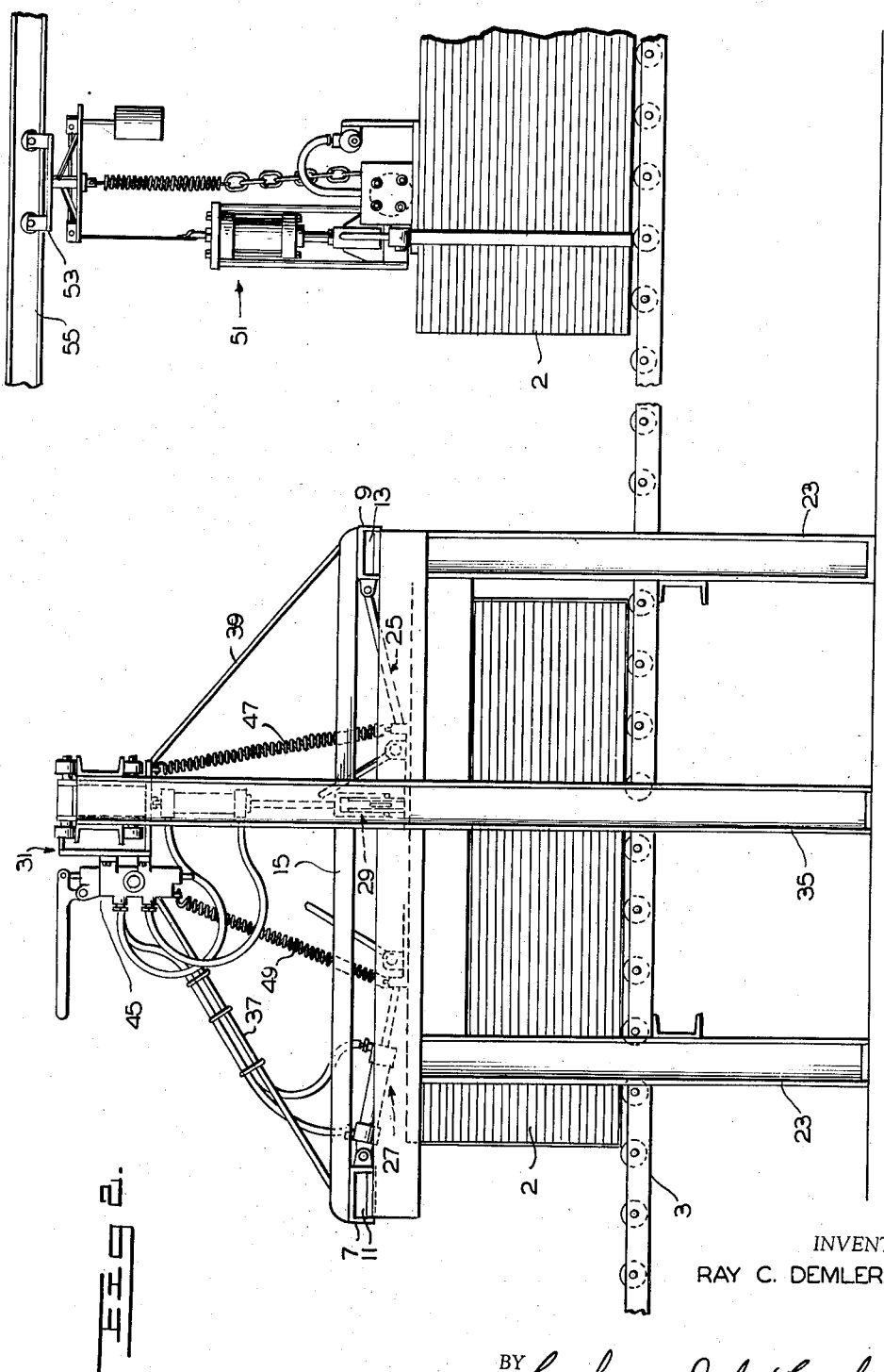

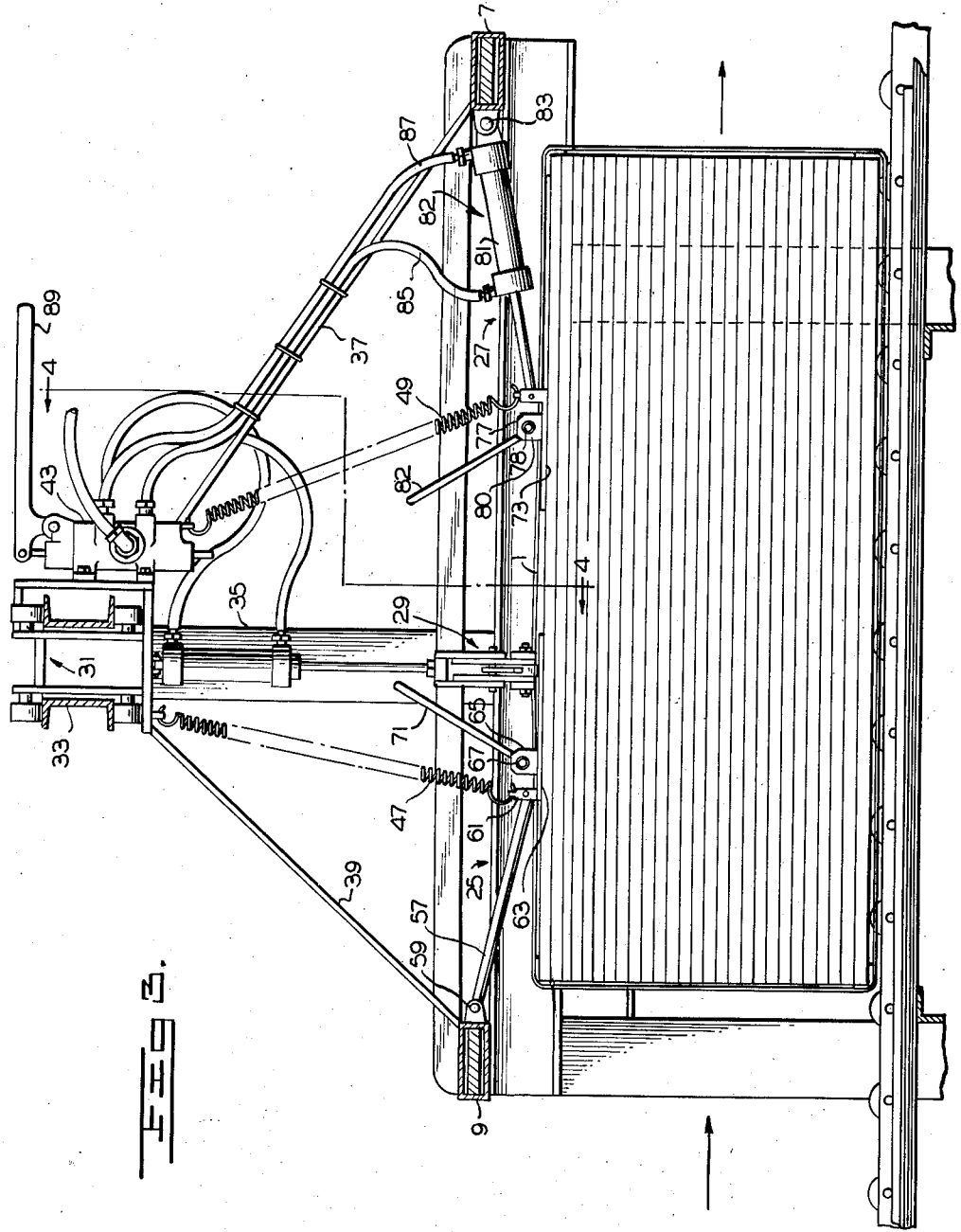

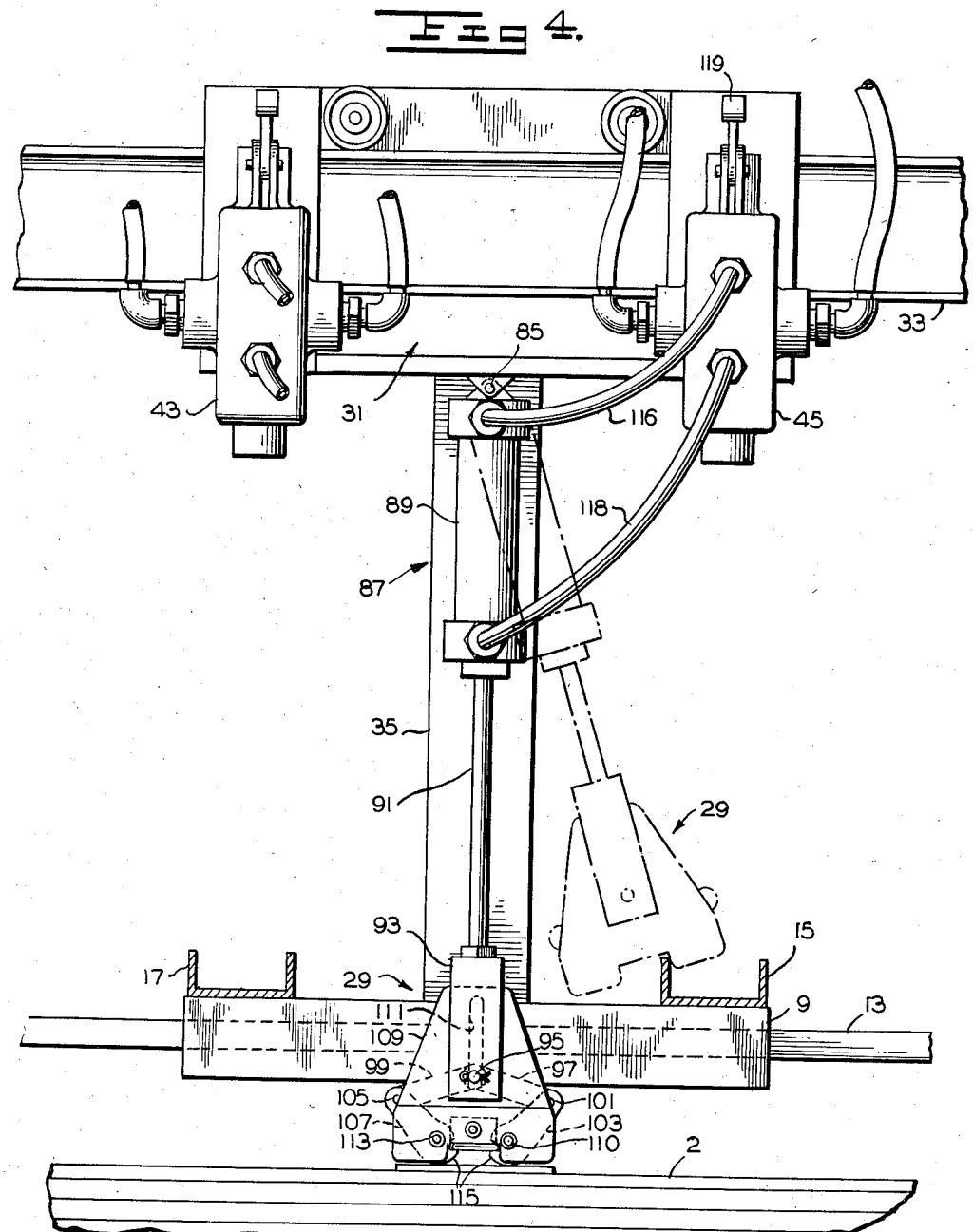

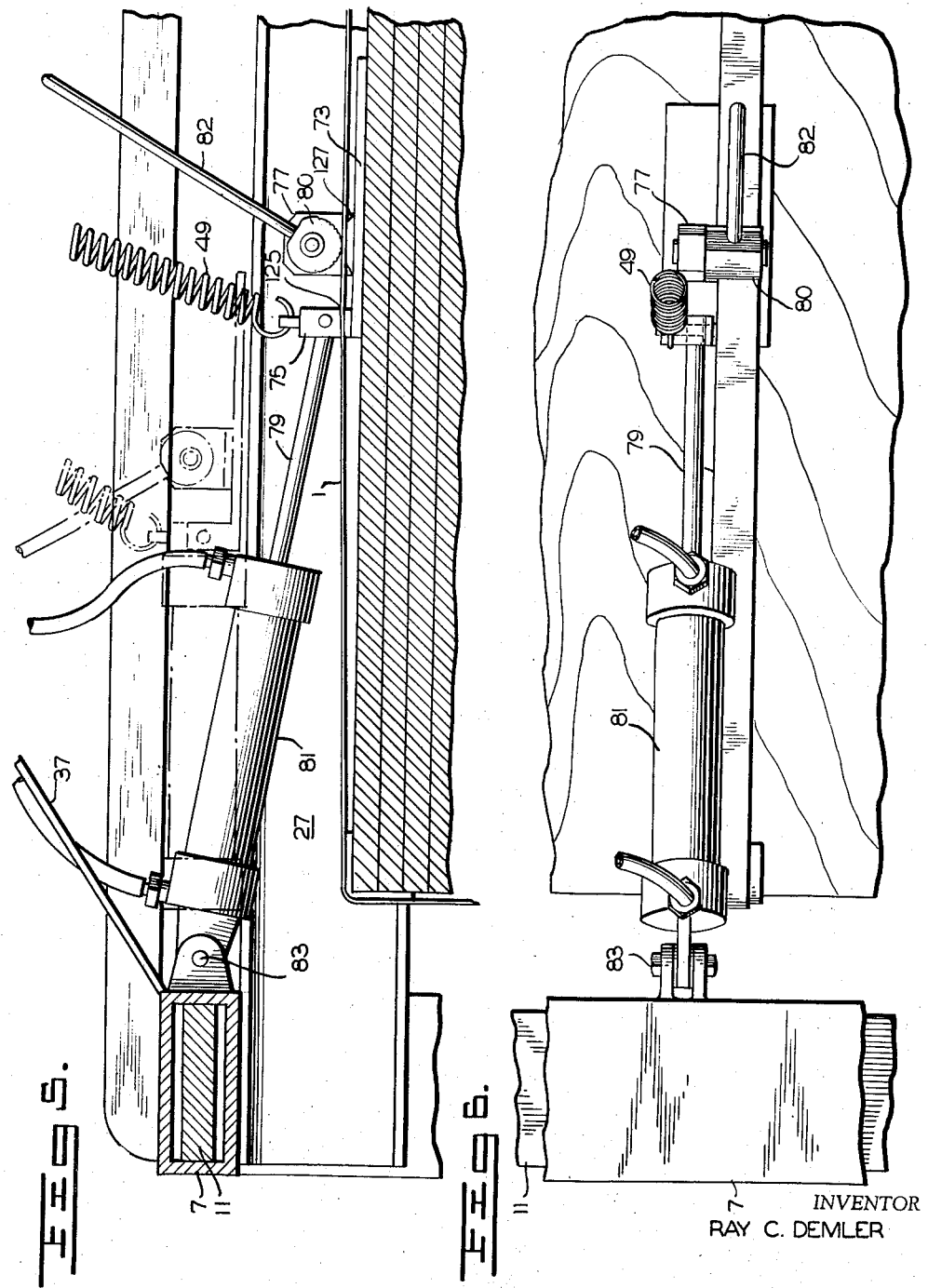

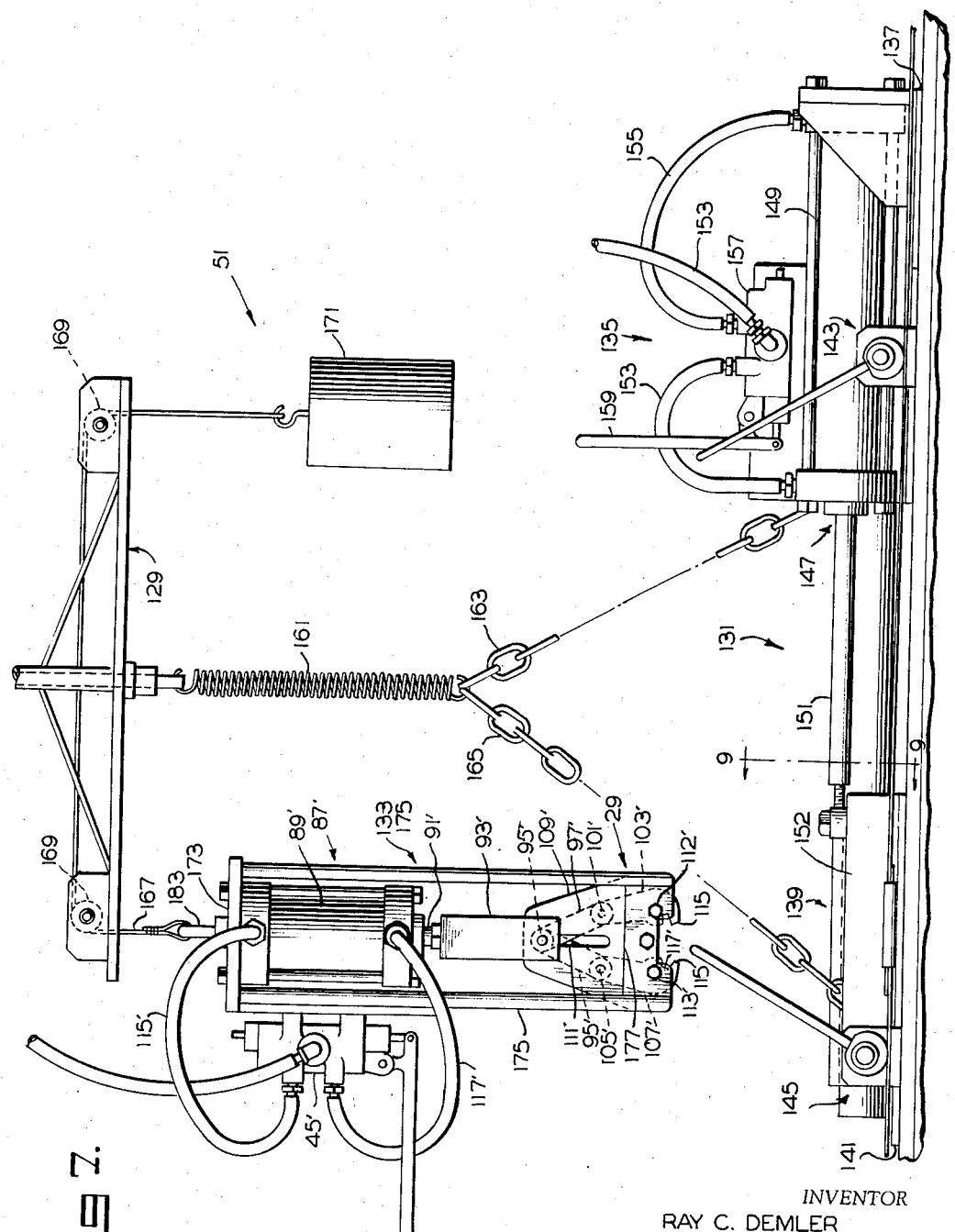

June 17, 1958
R. C. DEMLER
2,838,992
APPARATUS FOR APPLYING METAL BANDS
ABOUT AN ARTICLE OR ARTICLES
Filed Sept. 2, 1952
8 Sheets-Sheet 8
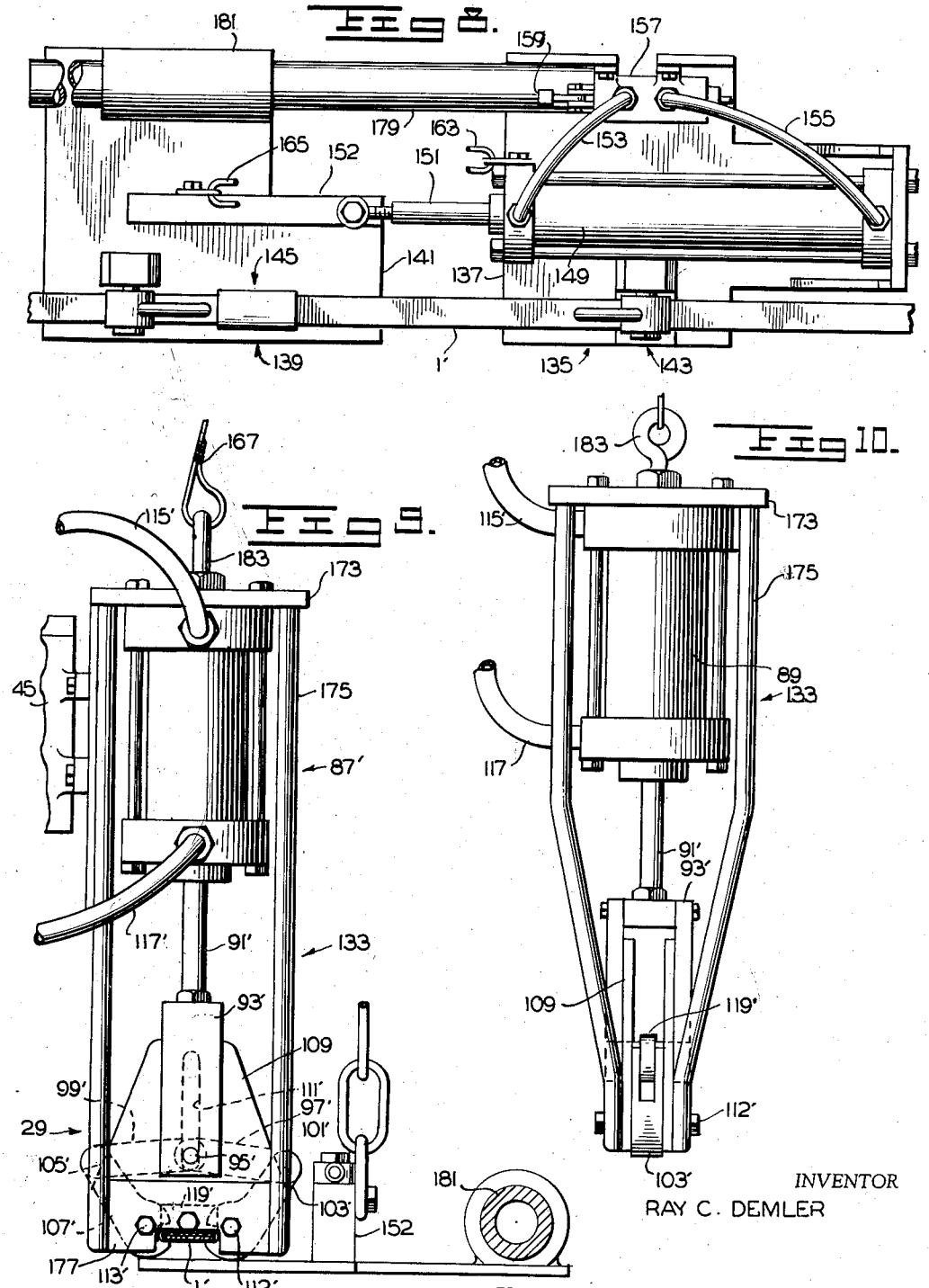
INVENTOR
RAY C. DEMLER
BY Cushman, Darby & Cushman
ATTORNEY United States Patent Office 2,838,992
Patented June 17, 1958

2,838,992

APPARATUS FOR APPLYING METAL BANDS ABOUT AN ARTICLE OR ARTICLES

Ray C. Demler, Tacoma, Wash., assignor to International Packaging Corporation, Tacoma, Wash., a corporation of Washington Application September 2, 1952, Serial No. 307,482

9 Claims. (Cl. 100—32)

This invention relates to a packaging apparatus and more particularly to a semi-automatic apparatus for tightening metal bands about an object and for fastening a sealing clip member about the overlapped ends of each of the band members to hold the overlapped ends of the band tightly together, thereby maintaining the band tightly about the article or articles which it surrounds.

It often becomes desirable in preparing articles for shipment to bind such articles together by means of metal bands which are drawn up tightly around the periphery of the object being shipped, with the two opposite ends of each metal band being held together by a sealing clip member, such as a C-shaped clip, which is compressed or clinched in such manner as to hold the adjacent opposite ends of the metal band together. For example, such metal bands might be wrapped around a crate or might be used to hold together in assembled relation a stack of plywood sheets which are being shipped as a unit.

In applying metal bands of the type just mentioned, it has often been the practice to use manually operated apparatus for pulling the ends of each band together and for subsequently compressing or clinching a sealing clip member in place to secure the ends of the band together. The use of manually operated apparatus often results in a waste of the metal band, since it is frequently necessary to discard as much as nine inches of each metal band after the ends of the band have been fastened in position. Furthermore, manually operated band tightening and clinching devices often require the use of considerable manual exertion in their operation.

Accordingly, it is an object of this invention to provide a semi-automatic banding apparatus for tightening a metal band about an object and for compressing or clinching a sealing clip about the overlapped opposite ends of the band which is more efficient and faster in operation than banding devices heretofore used.

It is a further object of this invention to provide a semi-automatic labor saving apparatus for tightening and clinching a band about an object.

It is a still further object of this invention to provide a fluid operated banding apparatus which is semi-automatic in operation and which substantially eliminates any waste of the banding material.

Another object of this invention is to provide a banding apparatus which permits banding of an article or a stack of superposed articles in both a transverse and a longitudinal direction, using a fluid-operated means for tightening the band and a fluid operated means for applying a sealing clip member to the overlapped ends of the band.

In accordance with these objectives, this invention provides a banding apparatus comprising a pair of substantially aligned clamping members adapted to receive the respective opposite ends of the band, with one of the clamping members being movable by a fluid operated mechanism in such manner as to approach the other clamping member to permit tightening of the band about the article being banded, with the opposite ends of the band being overlapped, and with a fluid operated device for compressing or clinching a sealing clip member about the overlapped ends of the band, this device being disposed substantially perpendicularly to the plane of the two aligned clamping members.

The features of my invention which I believe to be novel are set forth with particularity in the appended claims. My invention itself, however, both as to its organization and use, together with further objects and advantages thereof, may best be understood by reference to the following description taken in connection with the accompanying drawings in which:

Figure 1 is a perspective view of a mechanism for tightening and securing bands in parallel relation about a stack of plywood panels, in accordance with my invention;

Figure 2 is a side elevation view of Figure 1 and also includes, in combination therewith, a side elevation of a modified banding apparatus for securing bands to the bundles transversely with respect to the bands of Figure 1.

Figure 3 is a vertical sectional view taken substantially along line 3—3 of Figure 1;

Figure 4 is an enlarged detailed vertical sectional view taken along line 4—4 of Figure 3;

Figure 4a is a detail view of the clinching jaw members and the punch member which are used to clinch a clip member about the superposed ends of a band member;

Figure 4b is a plan view of a clip member after it has been clinched about the ends of a band member;

Figure 4c is a sectional view along line 4c of Figure 4b.

Figure 5 is an enlarged fragmentary sectional view of the movable band clamping means of Figures 1 and 3;

Figure 6 is a top plan view of Figure 5;

Figure 7 is a front elevation view of the modified form of banding apparatus in accordance with my invention used for applying both transverse and longitudinal bands;

Figure 8 is a top plan view of the band tightening mechanism of Figure 7;

Figure 9 is a vertical sectional view along line 9—9 of Figure 7 and shows the band clinching device in a lowered position; and Figure 10 is a side elevation of the band clinching device of Figure 9.

Briefly, my invention provides an apparatus for drawing up a metal band tightly about an article or articles to be held in assembled relation and for compressing or clinching a sealing clip member about the overlapped ends of the tightly drawn metal band. The arrangement shown in Figures 1–6, inclusive, provides, in accordance with my invention, a traversing device, generally indicated at 4, which comprises a first longitudinally slidable carriage 5 which carries the band tightening device, and a second longitudinally slidable carriage 31 for supporting a clinching device 29 which clinches the sealing clip about the overlapped ends of the band. The longitudinally slidable carriages 5 and 31 are rigidly connected to each other and are movable as a unit along suitable tracks 11, 13, and 33 in order that the traversing device 4 may be positioned adjacent the particular band which is being tightened and clinched. The longitudinally slidable carriage 5 supports a pair of oppositely disposed pivotally mounted clamping assemblies 25 and 27 for holding the opposite ends of the band, with the clamping assembly 27 being movable toward the clamping assembly 25 in order to tighten the band member. A fluid driven motor means 81 is provided for imparting motion to the clamping assembly 27. The clinching device 29 is pivotally supported from the movable carriage 31, being disposed substantially perpendicularly to the clamping assemblies 25 and 27 and intermediate of the two clamping assemblies. A fluid driven motor 87 is provided for actuating the clinching device 29 in such manner as to compress or clinch a sealing clip member about the overlapped ends of a given band member.

The apparatus shown in Figures 7–10 provides a modified band tightening and clinching apparatus in accordance with my invention in which the band tightening assembly 131 and the clinching device 133 are both supported by a rotatable carriage 129 which may be easily rotated to any desired position. In accordance with this modified form of my invention, the two band clamping devices 135 and 139 are connected together by the piston rod 151 of a fluid driven motor 147 in such manner that motion of the piston rod 151 causes relative motion of the two clamping assemblies 135 and 139 with respect to each other to thereby tighten the band tightly about the article being banded. The clinching device 133 is supported from the same rotatable carriage member 129 which suports the two clamping devices 135 and 139, with a pulley means 167 being provided to support the clinching device 133 with respect to the rotatable carriage 129.

Referring now in detail to the drawings, and more particularly to Figures 1–6, it will be noted that my banding apparatus is being used to apply bands 1 to a stack of superposed plywood panels generally designated as 2. However, it will be understood that my invention is equally applicable to the banding of any article or articles about which it is desired to tightly wrap a band member having its opposite ends held together by a compressed or clinched sealing clip member.

The panels 2 are preferably assembled in superposed relation at an assembly station displaced a short distance away from the banding apparatus. Thus, the panels 2 may be stacked in superposed relation at some location along the roller tracks 3, and subsequently slid into position beneath the banding apparatus. A plurality of bands 1, of accurately predetermined length, are stacked in trough-like support or rack members 6 below the plywood panels being banded. In applying the bands 1, a given band is manually picked up from rack member 6, brought up around the sides of the stack of plywood panels and up over the upper surface of the panels and clamped into the band tightening assembly, which will be more fully described hereinafter.

The embodiment of my banding apparatus shown in Figures 1–6 comprises a longitudinally slidable traversing mechanism, generally referred to as 4. The traversing mechanism 4 comprises a band tightening apparatus carried by lower frame or carriage 5, which is slidable on tracks 11 and 13, and a clinching apparatus which is carried by an upper frame or carriage 31 which is slidable on track 33. The lower carriage 5 and the upper carriage 31 are rigidly connected together and move as a unit along their respective tracks. The carriage 5 is of generally hollow rectangular shape and comprises a pair of oppositely disposed channel shaped members 7 and 9, adapted to slide along longitudinally extending tracks 11 and 13 to permit positioning of carriage 5 at any desired location with respect to the panels 2 which are being banded. The channel shaped members 7 and 9 have their corresponding opposite ends connected together by transversely extending members 15 and 17.

The tracks 11 and 13 are supported and joined together at their corresponding opposite ends by transversely extending members 19 and 21. The tracks 11 and 13, together with the oppositely disposed cross members 19 and 21, define a plane substantially parallel to the plane of the uppermost of the panel members 2. The ends of each of the respective bands 1 are secured together along the upper surface of the stack of superposed panel members 2. I prefer to connect the ends of each respective band at the upper surface of the article or articles being banded, since this is the most convenient position for securing the ends of the band. Consequently, the carriage which carries the band tightening and clip compressing or clinching mechanism is shown disposed above the uppermost surface of the panels 2.

The cross members 19 and 21 which support tracks 11 and 13 are in turn supported by vertically extending posts 23, which are positioned beneath the opposite ends of each of the respective cross members 19 and 21.

To tighten the band 1, I provide, in accordance with my invention, a band tightening apparatus carried by slidable frame or carriage 5 and comprising a stationary pivoted clamp assembly generally designated as 25, and a movable pivoted clamp assembly, generally designated as 27. The movable pivoted clamp assembly 27 is fluid operated, either by a gaseous fluid, such as air, or by a liquid fluid to thereby cause relative motion of the two clamp assemblies toward each other to tighten the band. The stationary clamp assembly 25 is pivotally attached to channel shaped member 9 intermediate of the length of member 9, and extends over the uppermost of the panel members 2 in order to hold one end of a band 1. The movable clamp assembly 27 is pivotally connected to the oppositely disposed channel shaped member 7 and is substantially in alignment with clamp assembly 25 when both assemblies are in a horizontal position.

A fluid control valve 43 is mounted on the upper slidable frame or carriage 31 and serves to regulate the flow of the pressure fluid which controls the operation of the fluid operated clamping device 27. A similar fluid control valve 45 is also mounted on the carriage 31 and is used to control the flow of pressure fluid which operates the fluid operated clip sealing or clinching device 29. As will be seen most clearly in Figures 2 and 3, the stationary clamping assembly 25 is pivotally connected to the channel member 9, and extends down toward the uppermost surface of the panel members 2 in such manner as to grip an end of a band member 1. Similarly, the fluid operated movable clamping assembly 27 extends down toward the surface of the uppermost of the panel members 2 in such manner as to grip an end of a band 1. The lower end of a spring member 47 is connected to clamp assembly 25, and tends to maintain clamp assembly 25 in a horizontal position when the clamp assembly is not being used for clamping a band 1. The opposite end of spring 47 is connected to a point on the carriage 31. Similarly, a spring 49 has one of its ends connected to clamp assembly 27 at a point displaced from the pivot point of the clamp assembly 27, with the opposite end of the spring 49 being connected to a point which is stationary with respect to the carriage 31, the connection in this case being made to the casing of the fluid control valve 43.

As will be seen most clearly in Figure 3, the stationary clamping assembly 25 comprises base plate 63 upon which are rigidly mounted vertical posts 61 and 65. A rod 57, which is pivotally attached to channel member 9 at 59 is pivotally attached at its opposite end to vertical post 61. Vertical post 65 serves as a bearing for a pin 67 which carries an eccentrically mounted round locking member 69. A handle member 71 is rigidly attached to locking member 69, and is the means by which locking member 69 is rotated.

Fluid operated clamping assembly 27 comprises a base plate member 73 upon which are mounted vertical posts 75 and 77. Post 77 serves as a bearing for pin 78, upon which is eccentrically mounted a round locking member 80. A handle member 82 is rigidly attached to locking member 80 and is the means by which locking member 80 is rotated. A piston rod 79 projects from the cylinder 81 of a fluid driven motor generally designated as 82 and is pivotally connected to vertical post 75. The opposite end of piston rod 79 terminates in a piston head within the cylinder 81 of the fluid driven motor device 82. The casing of the fluid motor is pivotally connected at point 83 to channel member 7. The cylinder 81 of the fluid driven motor device is connected by flexible conduits 85 and 87 to the fluid control valve means 45. An operating handle 89 connected to valve means 45 is used to control the admission of the pressure fluid to the fluid driven motor to permit selective operation of the piston rod 79 in either direction.

It will be noted that the respective eccentric locking members 69 and 80 are supported on one side only, thus facilitating insertion of the bands 1 into the clamps, and also facilitating removal of the clamps after the banding operation has been completed.

As can be seen more clearly in Figure 5, the base plate 73 may be provided with a lip or ledge 127 directly underneath the surface of the locking member 80, ledge 127 serving as a rest or support for the portion of band 1 beneath the surface of locking member 80. There is also shown in dotted outline in Figure 5 the position which the clamping assembly 27, with its associated fluid driven motor means, assumes when the clamping assembly is not being used to clamp an end of the band 1. As the been explained previously, the spring 49 normally raises the clamping assembly 27 to a substantially horizontal position when the clamping assembly is not in use. It will be noted that in the raised position shown in dotted outline, the piston rod 79 is also shown retracted into the cylinder 81, with the result that the base plate 73 and the attached locking member 80 have been retracted toward the cylinder 81.

In order to compress or clinch a clip member about the overlapped ends of the respective band members 1, I provide in accordance with my invention a fluid operated compressing or clinching device generally designated as 29, which is shown most clearly in Figure 4. The fluid used for the operation of clinching device 29 may be either a gaseous fluid, such as air, or a liquid fluid.

Fluid operated clinching device 29 is positioned substantially perpendicularly to the plane of the panel members 2 and is pivotally supported by a second movable frame or carriage generally designated as 31 which is slidable along a track 33. Track 33 is positioned above the plane of the uppermost surface of the plywood panels 2 by a distance sufficient to accommodate the vertical height of the fluid operated clinching device 29 in its extended position, as will be explained more fully hereinafter. The track 33 may consist of a pair of U-beams which are supported by vertical posts 35. The upper slidable frame or carriage 31 may be provided with rollers to permit easy shifting of the carriage 31 along the track 33. The upper slidable frame or carriage 31 is held in a fixed position with respect to the lower slidable frame or carriage 5 by brace members 37 and 39 which are rigidly attached at one end to an intermediate point of upper slidable frame or carriage 31 and at their opposite ends intermediate of the respective oppositely disposed channel shaped members 7 and 9 of lower slidable frame or carriage 5.

As can best be seen in Figure 4, the clinching assembly 29 is pivotally mounted at point 85 from the lower surface of slidable carriage 31. Clinching assembly 29 is provided with a fluid driven motor indicated generally at 87 and having a cylinder 89 and a piston rod 91. The piston rod 91 is attached at its lower end to a yoke member 93, which comprises a pair of vertically disposed substantially parallel displaced plate members which are rigidly attached at their upper ends to rod 91. Yoke member 93 is provided at its lower end with a pin member 95 to which are pivotally attached links 97 and 99. The outer end of link 97 is pivotally attached by a pin 101 to a clinching jaw member 103. Similarly, link 99 is pivotally connected by pin 105 to a clinching jaw member 107.

The clinching assembly is provided with a pair of oppositely disposed substantially parallel side plate members 109. Each of the side plate members 109 is provided with a vertical slot 111 to permit vertical motion of pin 95 of yoke member 93. The plates of the yoke member 93 are disposed adjacent the outer surfaces of the respective oppositely disposed side plate members 109, with each of the respective plates of yoke member 93 being disposed adjacent a different one of the side plate members 109. Clinching jaw mmber 103 is pivotally connected to a pin 110 which is supported by both of the side plate members 109. Similarly, clinching jaw member 107 is pivotally connected to a pin 113 which is supported by both of the side plates 109. As is more clearly shown in Figure 4a, each of the respective clinching jaw members 103 and 107 is provided with a pair of projecting lip portions 115 which are separated by a slot 117. A die member 119 is rigidly secured by a bolt or other suitable means between the side plates 109. Die member 119 is provided with a pair of die elements 121. The jaw members 103 and 107 are provided with an upper edge 122 which serves to cam the clip member out of engagement with die member 119 after the clinching operation is completed.

The base plate 63 of stationary clamping assembly 25 extends underneath the clinching device 29 in such manner as to serve as a working surface for the lower end of the clinching jaws 103 and 107 so that the force applied to the jaws by the cylinder and piston assembly 87 is not transmitted directly to the uppermost of the plywood panels.

The fluid driven motor 87 is connected to the valve mechanism 45 through flexible conduits 116 and 118. An operating handle 119 is provided, and is the means by which the pressure fluid is selectively admitted to cause motion of piston rod 91 to either a retracted position within the cylinder 89 or to an extended position outwardly of the cylinder 89.

It can be seen that when pressure fluid is admitted to the cylinder 89 of fluid driven motor 87 in such manner as to cause downward motion of piston rod 91, the yoke member 93 will move downwardly, and pin member 95 will slide along the vertical slot 111. Motion of the yoke member 93 is transmitted to the links 97 and 99, and causes the clinching jaw members 103 and 107 to be rocked upwardly about pins 111 and 113 in such manner as to cause the lip portions 115 to bear against the lower surface of the clip, the die elements 121 fitting down into the slot 117 in a punch-and-die relation. As can best be seen in Figure 4c, the open edges 123 of the clip are pressed upwardly by the lip members 115 so as to tightly grip the superposed ends of the band. At the same time, the die elements 119 are forced into the clip and band to emboss these members as shown at 124, in such manner that the embossed portions of the clip and band interlock with each other, thereby holding the clip and band securely together.

*Summary of operation*

In using the apparatus of my invention, the bands 1 are applied one at a time with the bands being cut to a predetermined length such that the band, when drawn tightly around the article or articles being banded, will have a small overlap between its respective opposite ends. Before wrapping a band 1 about the superposed panels 2, right angle corner protector members 41 are preferably positioned adjacent the uppermost surface and side surface of the stack of superposed panel members 2, and also adjacent the botttom most surface and side surface of the panel members 2 to serve as a bearing for each of the respective band members 1.

In operating the arrangement shown in Figures 1-6 inclusive, the traversing mechanism 4, which includes movable carriages 5 and 31 is moved along tracks 11, 13 and 33 to a position where a transversely extending band 1 is to be applied.

One end of a given band 1 is inserted in the stationary clamping assembly 25 so that the band is held between the outer surface of the base plate 63 and the lower surface of eccentrically mounted locking member 69. The band is positioned in such manner that the band projects beyond the locking member 69 toward the oppositely disposed movable clamping assembly 27. The locking member 69 is rotated by the handle 71 so as to tighten the eccentrically mounted locking member 69 down against the band 1, and hold it tightly in position.

In a similar manner, the opposite end of the same band 1 is inserted into movable clamping assembly 27 in such manner that the band is held between the lower surface of the locking member 80 and the outer surface of the base plate 73. The handle 82 of clamping assembly 27 is rotated after the band 1 is in place, in such manner as to tighten the locking member 80 down against the band and to hold it tightly in position between the under surface of the locking member 80 and the outer surface of base plate 73.

The eccentrically mounted locking members 69 and 80 are rotatably mounted in such manner that tension on the respective ends of the band will tend to rotate the respective locking members in a locking direction. Thus, referring to Figure 3, the locking member 69 of stationary clamping assembly 25 is so arranged that locking is caused by rotation in a clockwise direction with respect to the view shown in the drawing. Similarly, the locking member 80 is mounted in such manner that locking is caused by rotation in a counterclockwise direction, with respect to the view shown in Figure 3.

After the respective opposite ends of a given band 1 have been clamped in position as just described, a pressure fluid, such as air, is admitted to the operating cylinder 81 of the fluid driven motor in such manner as to cause the piston rod 79 to move outwardly, thereby moving clamping assembly 27 with its attached end of band 1 toward the stationary clamping assembly 25. This causes the band 1 to be drawn up tightly around the superposed panel members 2, and the length of the band 1 is precut to a length such that when the band is tightly drawn around the object being banded a few inches of the respective opposite ends of the given band will be in overlapping relation to permit attachment of a clinched sealing clip member. An open sealing clip member is so positioned that it surrounds the overlapped ends of the band.

While the opposite ends of the band are in overlapped relation, and surrounded by the sealing clip which is to be clinched, the pivotally mounted clinching assembly 29 is swung down from its inoperative position, shown in dotted outline in Figure 4, into operating position. The clip member and overlapped ends of the band are held between the clinching jaws 103 and 107 of the clinching device 29. The valve means 45 is actuated to cause the pressure fluid to be admitted to the cylinder 89 of the fluid driven motor 87, in such manner as to cause piston rod 91 to move outwardly from the cylinder 89. When this occurs, the clinching jaws 103 and 107 are rocked about the fixed pivot points 111 and 113 and cause lip portions 115 of the clinching jaws 103 and 107 to bear against the lower surface of the clip member in such manner as to mate with the die elements 121 of stationary die member 119, which engage the upper surface of the clip member. This punch-and-die engagement of the jaw members 103 and 107 with the stationary die member 119 causes the clip member and the superposed ends of band 1 to be embossed in such manner that the embossed portions of the clip and band interlock with each other, thereby holding the clip and band securely together. At the same time the open portions 123 of the clip member are pressed into engagement with the undersurface of the overlapped ends of the band.

After the clinching operation has been completed, the clinching jaws 103 and 107 are disengaged from the clip by admitting pressure fluid to the cylinder 89 in such direction as to cause piston rod 91 to retract. The edges 122 of the clinching jaws cam the clip member out of engagement with the die member 119. The locking members 69 and 80 are then manually moved to unlocked position and the connected slidable frames 5 and 31 are shifted along their respective tracks, so that the clamping and clinching arrangements are clear of the band.

There is shown in Figures 7, 8, 9 and 10 the modified form of my invention, a side elevation view of which is generally indicated at 51 in Figure 2. In the view shown in Figure 2, the modified arrangement 51 is shown as a second banding station. The modified form of my invention shown in Figures 7-10 may be used for banding both transversely and longitudinally of the article being banded. As can best be seen in Figure 7, the banding apparatus 51 is provided with a rotatably mounted carriage indicated generally at 129. The carriage 129 serves as a support for both the clamping assembly, indicated generally at 131, and the clinching assembly, indicated generally at 133. The rotatable carriage 129 may be supported from a slidable frame or carriage 53, slidable on track 55, as shown in Figure 2 but not shown in Figure 7. When the carriage 129 is rotated, both the clamping assembly 131 and the clinching assembly 133 turn with it. This arrangement permits banding in both a transverse and a longitudinal direction. The band tightening assembly 131 is provided with a first clamping device indicated generally at 135, mounted on a base plate 137, and a second clamping device indicated generally at 139, mounted on a base plate 141. Clamping device 135 is provided with a manually operated rotatable locking member indicated generally at 143. Similarly, clamping device 139 is provided with a locking member indicated generally at 145. Locking members 143 and 145 will not be described in detail, since they are similar in structure and operation to the locking device described in connection with Figure 5.

In order to provide relative motion between the clamping devices 135 and 139, a fluid driven motor, generally indicated at 147, is rigidly mounted on base plate 137 of clamping device 135. Fliud driven motor 147 is provided with a cylinder 149 and a piston rod 151. The clamping devices 135 and 139 are connected together through piston rod 151, which is rigidly attached to a vertical post 152 mounted on base plate 141 of clamping device 139. The fluid driven motor 147 is connected through flexible conduits 153 and 155 to a fluid admission valve device 157, which is connected to a source of pressure fluid. Operating handle 159 controls the admission of the pressure fluid to the operating cylinder 149 of the fluid driven motor 147 to cause motion of piston rod 151. It can be seen that when the direction of fluid pressure is such as to cause retraction of piston rod 151 into the operating cylinder 149 of the fluid operating device, the clamping devices 135 and 139 will be drawn together.

The whole band tightening assembly 131 of Figure 7, comprising clamping devices 135 and 139, is connected to the rotatable frame or carriage 129 through spring member 161, the upper end of which is connected to the center of frame or carriage 129, and the lower end of which is connected to chain members 163 and 165, which are respectively connected to clamping devices 135 and 139.

As will best be seen in Figure 8, there is provided a guide rod member 179, the right hand end of which, with respect to the view shown in the drawing, is rigidly connected to the clamping device 135. The clamping device 139 is provided with a sleeve type bearing 181, through which guide rod 179 passes. When relative motion of clamping assemblies 135 and 139 occurs due to the action of fluid motor 147, the guide rod 179 moves in the bearing 181, and thereby helps to maintain the two clamping assemblies aligned with respect to each other. The function of guide rod 179 and sleeve bearing 181 is to maintain the two clamping assemblies 135 and 139 in proper alignment with each other at all times.

Clinching assembly 133 is suspended from a pulley cable 167, which passes over pulley wheels 169, mounted on the rotatable carriage 129. A counterweight 171 is mounted at the opposite end of the pulley cable, and when it is desired to lower the clinching assembly 133 into position, the clinching assembly is pulled down into position against the force of the counterweight 171.

The clinching assembly 133 shown in Figures 7, 9 and 10 is generally similar to that described in connection with Figure 4. The clinching assembly 133 is provided with a fluid driven motor, generally indicated at 87', which is provided with a cylinder 89' and a piston rod 91'. A yoke member 93' is rigidly connected to the piston rod 91'. A pin 95' is supported by the lower end of yoke 93'. Clinching device 29' is provided with a pair of oppositely disposed side plates 109', which are vertically slotted to permit motion of pin 95' along the slot 111'. A pair of link members 97' and 99' are pivotally connected to pin 95'. The outer end of link 97' is pivotally connected by pin 101' to a clinching jaw member 103', which is pivotable about a fixed pivot pin 112', which passes through the side plates 109'. Similarly, the outer end of link 99' is pivotally connected about movable pin 105' to clinching jaw member 107', which in turn is pivotable about a pin 113', which is fixed with respect to the side plates 109'. The respective outer jaw members 103' and 107' are each provided with a pair of projecting lip portions, which are separated by a slot, similar to the embodiment shown in Figure 4a. A die member 119' is rigidly secured by a bolt or other suitable means between the side plates 109'. Die member 119' is provided with a pair of die elements which are so disposed as to be in alignment with the respective slots of each of the jaw members 103' and 107' when the fluid driven motor 87' is actuated in such manner as to cause a downward motion of yoke member 93'.

As can be seen best in Figures 9 and 10, the clinching assembly is provided with an anchor hook 183, to which is attached pulley cord or cable 167. The clinching assembly is also provided with an end plate 173, to which is bolted the upper end of the cylinder for the fluid driven motor. Vertically extending tie rods 175 are rigidly attached at their upper ends to end plate 173, and are also rigidly attached by welding or other suitable means at their lower ends to transversely extending side plates 177.

As may best be seen in Figure 10, the tie rods 175 are bent inwardly at their lower ends in order to conform to the narrower dimension of the lower part of the clinching assembly, as compared to the dimension of the cylinder of the fluid driven motor attached to the upper end of the assembly.

Summary of operation of arrangement of Figures 7–10

In the operation of the band clamping and clinching arrangement of Figures 7–10, the slidable frame or carriage 53 shown in Figure 2 is moved to the desired position along track 55, and the rotatably mounted frame or carriage 129 is then rotated into the proper position for applying either longitudinally extending or transversely extending bands. The ends of the band 1 are then inserted in the locking members 143 and 145 in the manner previously described, and the locking members are moved into locking position to hold the ends of the band tightly in position. The operating handle 159 of the valve device 157 is then actuated to cause the admission of pressure fluid to the cylinder 149 in such direction as to retract the piston rod 151 into the cylinder 149, thereby causing the clamping assemblies 135 and 139 to be drawn toward one another, which tightens the band 1.

The clinching device 133 is then lowered into position and pressure fluid is admitted to the cylinder 89' of the fluid driven motor 87' and causes the piston rod 91' to move out of the cylinder 89' in such manner as to rock the clinching jaws 103' and 107' about the fixed pivot pins 112' and 113'. This causes the jaws 103' and 107' to engage the die member 119' in a punch-and-die relation in such manner as to clinch the clip member about the overlapped ends of the band 1', thereby securing the clip member tightly about the ends of the band. After the clip member has been clinched, the clinching jaws 103' and 107' are disengaged by admitting pressure fluid to cylinder 89' in such direction as to cause piston rod 91' to move upwardly. The whole clinching assembly 87' is then raised so as to be clear of the band by pulling down on the counterweight 171. The locking members 143 and 145 are manually moved to unlocked position, and the whole clamping assembly 131 is moved laterally so as to be clear of the band upon which the clinching operation was performed.

It can be seen from the foregoing that I have provided in accordance with my invention an improved banding apparatus which permits semi-automatic clamping or tightening of a metal band about an article, and also provides in cooperative relation therewith a semi-automatic clinching means which permits clinching a clip member tightly about the overlapped ends of the band.

While there have been shown and described particular embodiments of my invention, it will be obvious to those skilled in the art that various changes and modifications can be made therein without departing from the invention, and therefore, it is aimed in the appended claims to cover all such changes and modifications as fall within the true spirit and scope of the invention.

I claim:

1. An apparatus for tightening a band member about an object so that the oppositely disposed ends of said band member may be fastened together, comprising a track member, a frame member slidable upon said track member, a first clamp member pivotally attached to one side of said frame member, a second clamp member pivotally attached to an oppositely disposed side of said frame member, said second clamp member being movable toward said first clamp member, said first and second clamp members being substantially in alignment with each other, and motor means connected to said second clamp member for moving said second clamp member toward said first clamp member to thereby tension said band member and to permit overlapping of said oppositely disposed ends of said band member.

2. An apparatus of the type defined in claim 1 in which said motor means comprises a piston member movable in a cylinder under the influence of a pressure fluid.

3. An apparatus for tightening a band member about an object so that the oppositely disposed ends of said band member may be fastened together, comprising a track member, a frame member slidable upon said track member, a first clamping device for holding an end of said band member, said first clamping device comprising a base plate member, a rod member pivotally connected at one of its ends to one side of said frame member and pivotally connected at the other of its ends to said base plate member, an eccentrically mounted rotatable locking member supported by said base plate member for holding an end of said band member, a second clamping device for holding the oppositely disposed end of said band member, said second clamping device comprising a base plate member and fluid operated motor means, said fluid operated motor means being pivotally connected to a side of said frame member opposite the side to which said rod member of said first clamping member is pivoted, said fluid operated motor means comprising a cylinder, a piston member movable in said cylinder, a piston rod rigidly attached to and movable with said piston, said piston rod projecting outwardly of said cylinder and being pivotally connected to said base plate member of said second clamping device, an eccentrically mounted rotatable locking member supported by said base plate member of said second locking device for holding an end of said band member, and means for admitting pressure fluid to said cylinder of said fluid operated motor means.

4. An apparatus for tightening a band member about an object so that the oppositely disposed ends of the band member may be fastened together, comprising: track means, frame means slidable upon said track means, a pair of spaced aligned clamp members carried by said frame means for relative movement toward and away from each other for holding the oppositely disposed ends of the band member, motor means carried by said frame means and operatively connected with at least one of said clamp members for effecting movement thereof toward the other clamp member to thereby tension the band member and to permit overlapping of the oppositely disposed ends thereof between said clamp members, said frame means providing an unobstructed vertical passage between said clamp members for positioning a separately mounted fastening device therein operable to fasten together the overlapping ends of the tensioned band member.

5. An apparatus as defined in claim 4 wherein each of said clamp members includes a locking member biased into locked position by the band member as said motor means moves said one clamp member toward the other and tensions said band member.

6. An apparatus as defined in claim 4 wherein the other of said clamp members is mounted on said frame means by a rod member pivotally connected at one end to said frame means and at its other end to said other clamp member and wherein said one clamp member is mounted on the frame means by said motor means.

7. An apparatus as defined in claim 4 wherein said frame means includes a portion engaging said track means and separately disposed rigid telescopic elements and said clamp members are mounted for movement toward and away from each other by said rigid telescopic elements to form a unit therewith including the motor means, and wherein said unit is suspended from said frame means portion.

8. An apparatus as defined in claim 4 wherein said clamp members are carried by said frame means by mounting means providing for vertical movement of said clamp members relative to said frame means.

9. An apparatus as defined in claim 8 wherein said mounting means includes spring means for resiliently maintaining said clamp members in a predetermined vertical position.

References Cited in the file of this patent

UNITED STATES PATENTS

| | | |
|---|---|---|
| 227,590 | Sheppard | May 11, 1880 |
| 240,856 | Sheppard | May 3, 1881 |
| 1,206,853 | Jones | Dec. 5, 1916 |
| 1,241,483 | Williams | Sept. 25, 1917 |
| 1,277,305 | Gerrard | Aug. 27, 1918 |
| 1,456,127 | Gerrard et al. | May 22, 1923 |
| 1,507,376 | Hintz | Sept. 2, 1924 |
| 1,784,025 | Norton | Dec. 9, 1930 |
| 1,963,593 | Prindle | June 19, 1934 |
| 2,007,781 | Webster | July 9, 1935 |
| 2,114,531 | Harvey | Apr. 19, 1938 |
| 2,624,270 | Sykes | Jan. 6, 1953 |